United States Patent [19]

Looker et al.

[11] 3,916,913
[45] Nov. 4, 1975

[54] VINE CROP HARVESTER PINCH OFF ROLLER WITH INSERTS

[75] Inventors: Olin L. Looker, Milford; Robert A. Johnson, Rossville; Frank F. Scribner, Hoopeston; Larry L. Slates, Vermilion, all of Ill.

[73] Assignee: FMC Corporated, San Jose, Calif.

[22] Filed: Mar. 21, 1974

[21] Appl. No.: 453,240

[52] U.S. Cl. ............ 130/30 R; 130/30 P; 56/327 R
[51] Int. Cl.² ..................................... ; A01D 45/00
[58] Field of Search ........ 130/30 R, 30 P; 56/327 R

[56] References Cited
UNITED STATES PATENTS

| | | | |
|---|---|---|---|
| 1,723,492 | 8/1929 | Ryder | 130/30 R |
| 3,347,031 | 10/1967 | De Long et al. | 56/327 R |
| 3,387,612 | 6/1968 | Tillotson | 56/327 R |
| 3,581,747 | 6/1971 | Scribner | 130/30 P |

*Primary Examiner*—George J. Marlo
*Attorney, Agent, or Firm*—C. E. Tripp

[57] ABSTRACT

One of the snapping rolls of a once over cucumber harvester has a steel hub formed with axial undercut grooves and inserts cut from A-size V-belt material projecting from the grooves. The preferred inserts are formed of extended urethane material but they can also be formed of V-belt material having layers of reinforcement in the rubber core matrix and wrapped with fabric.

6 Claims, 8 Drawing Figures

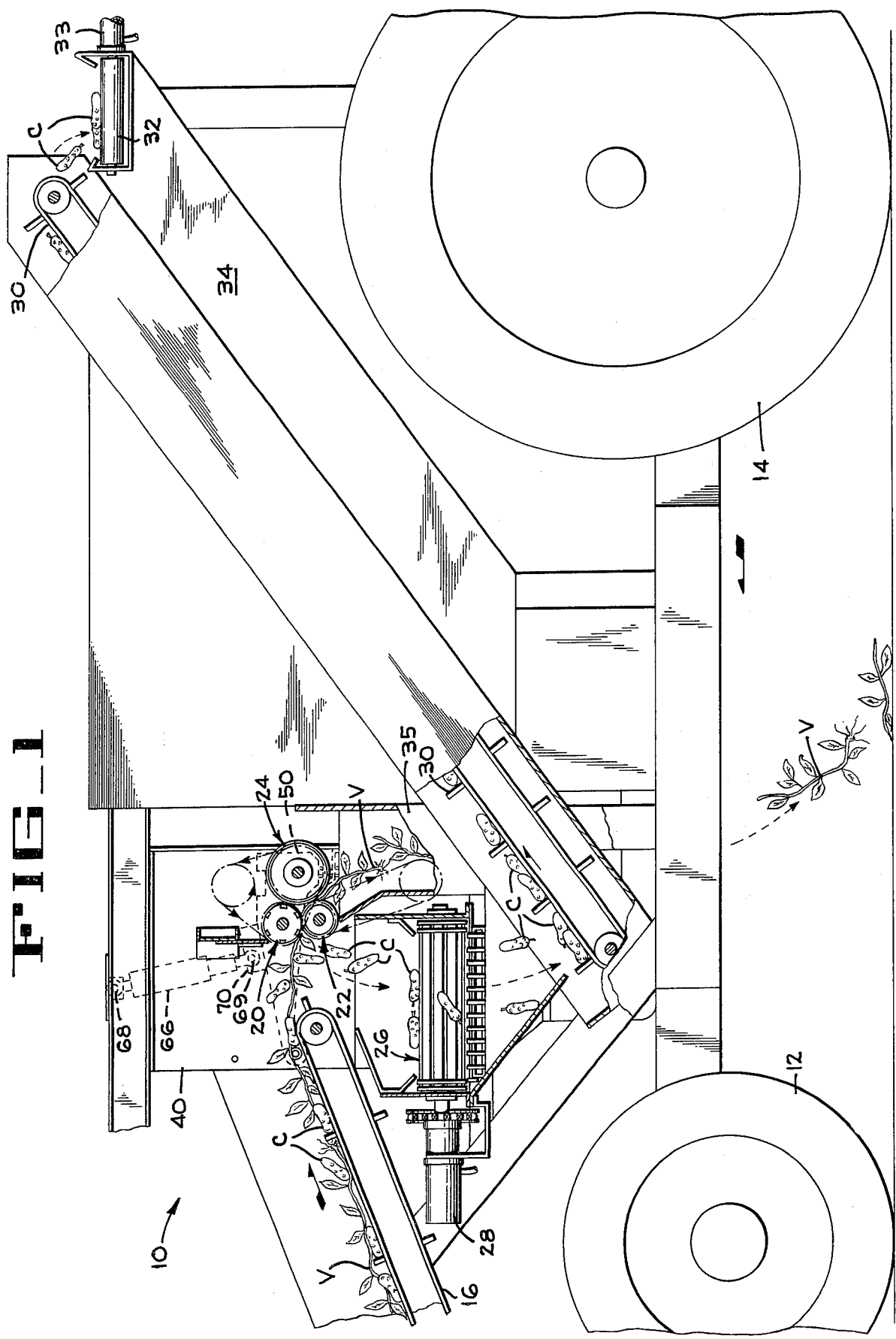

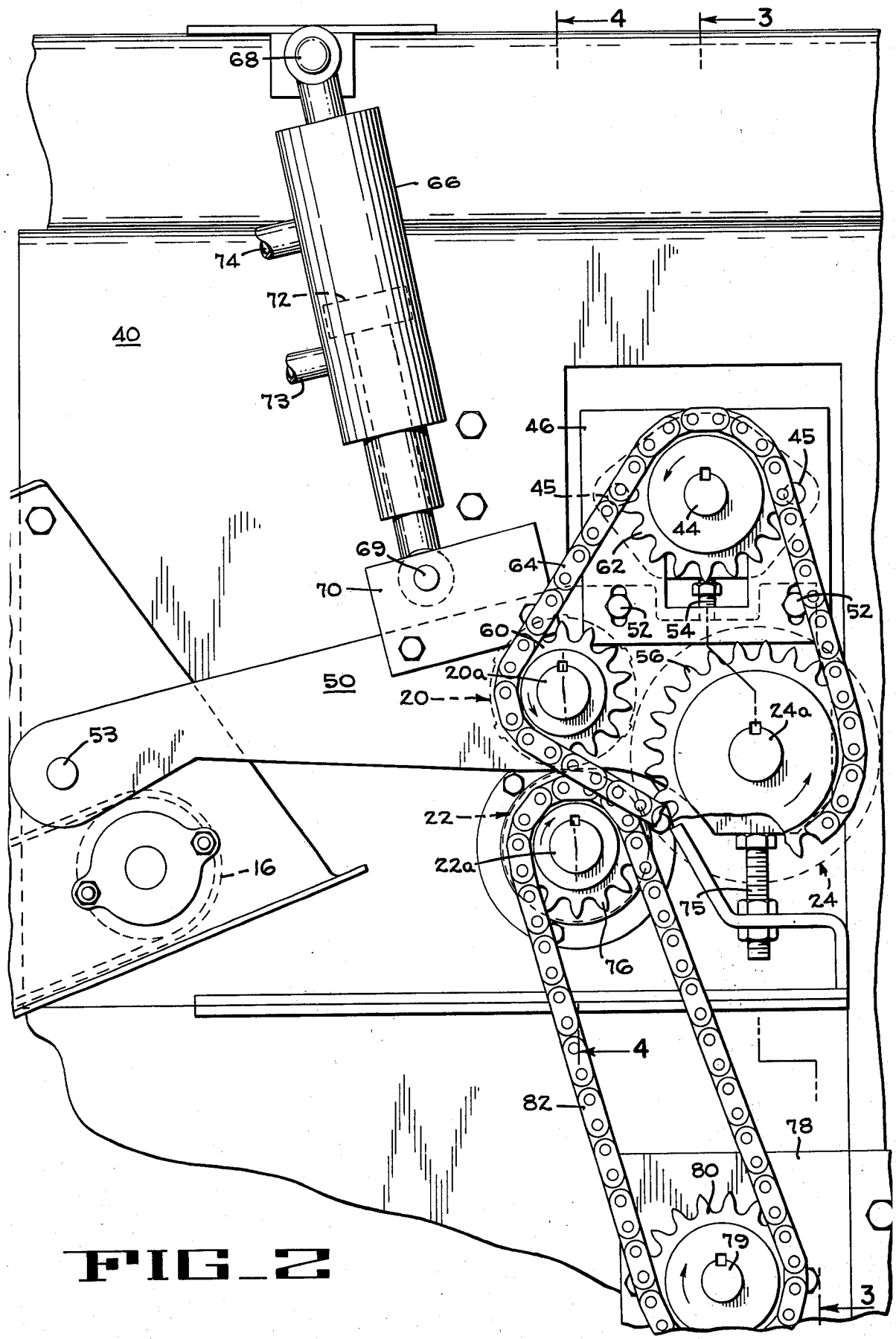
FIG_2

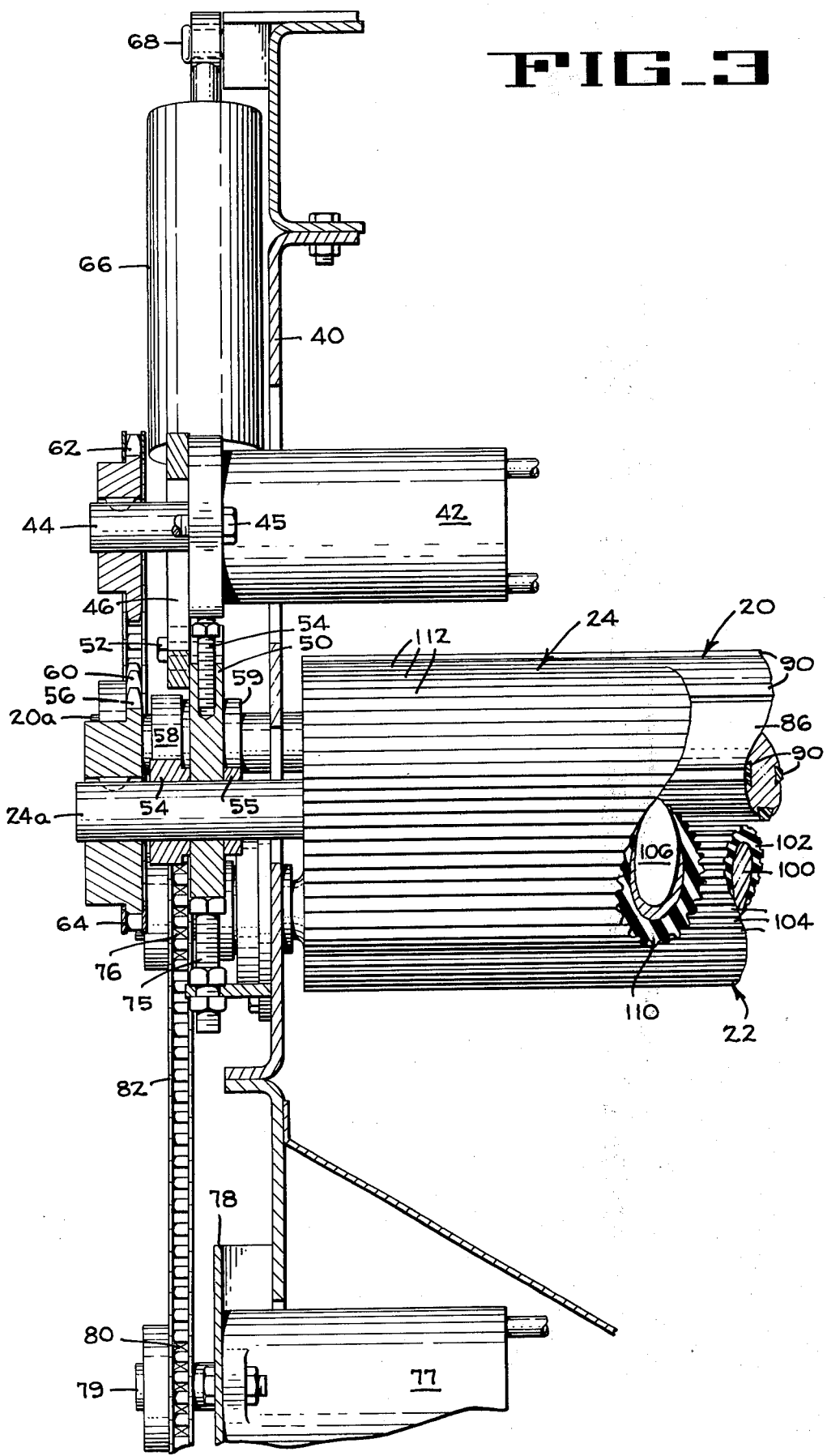
FIG_3

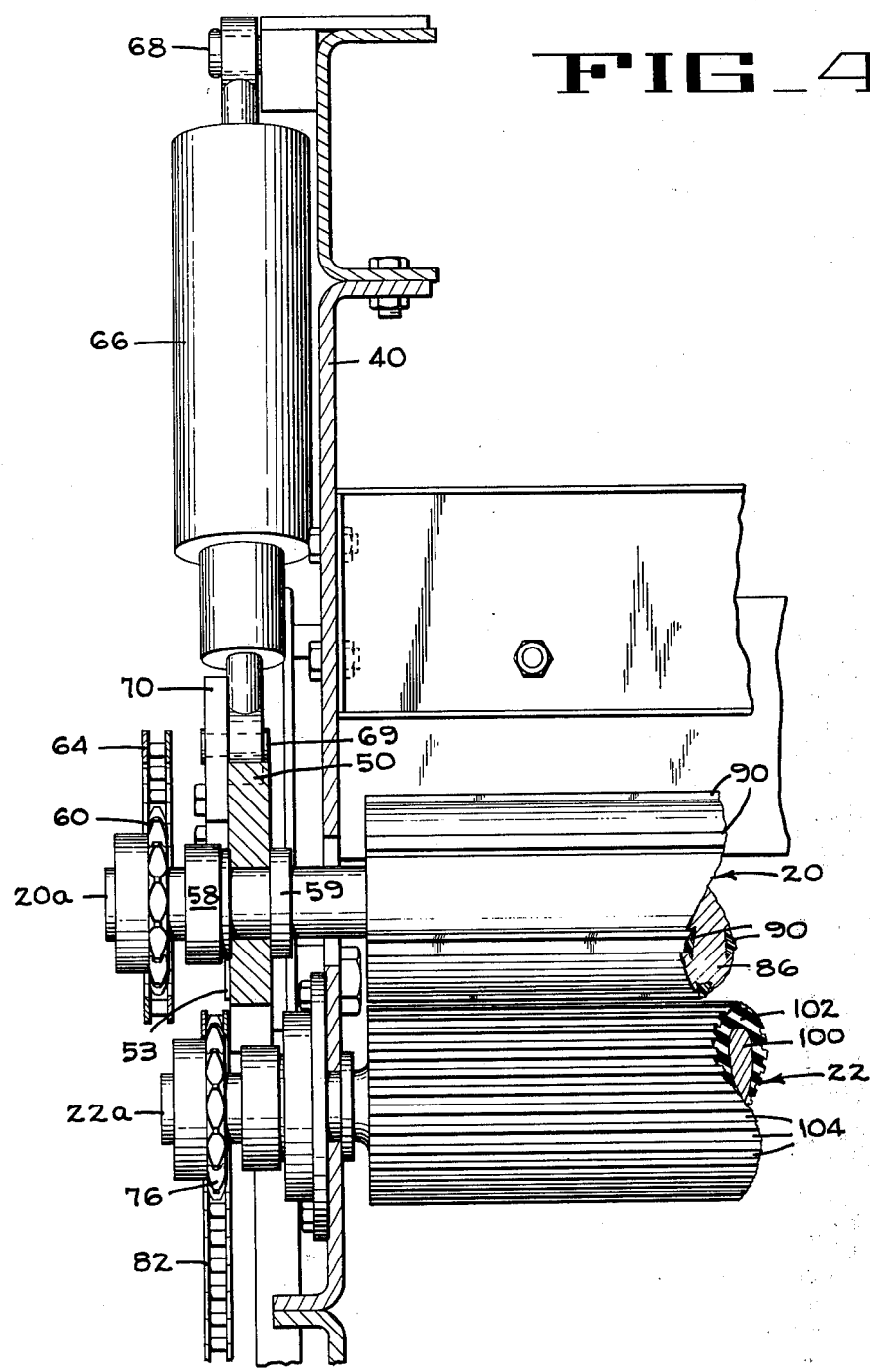
FIG_4

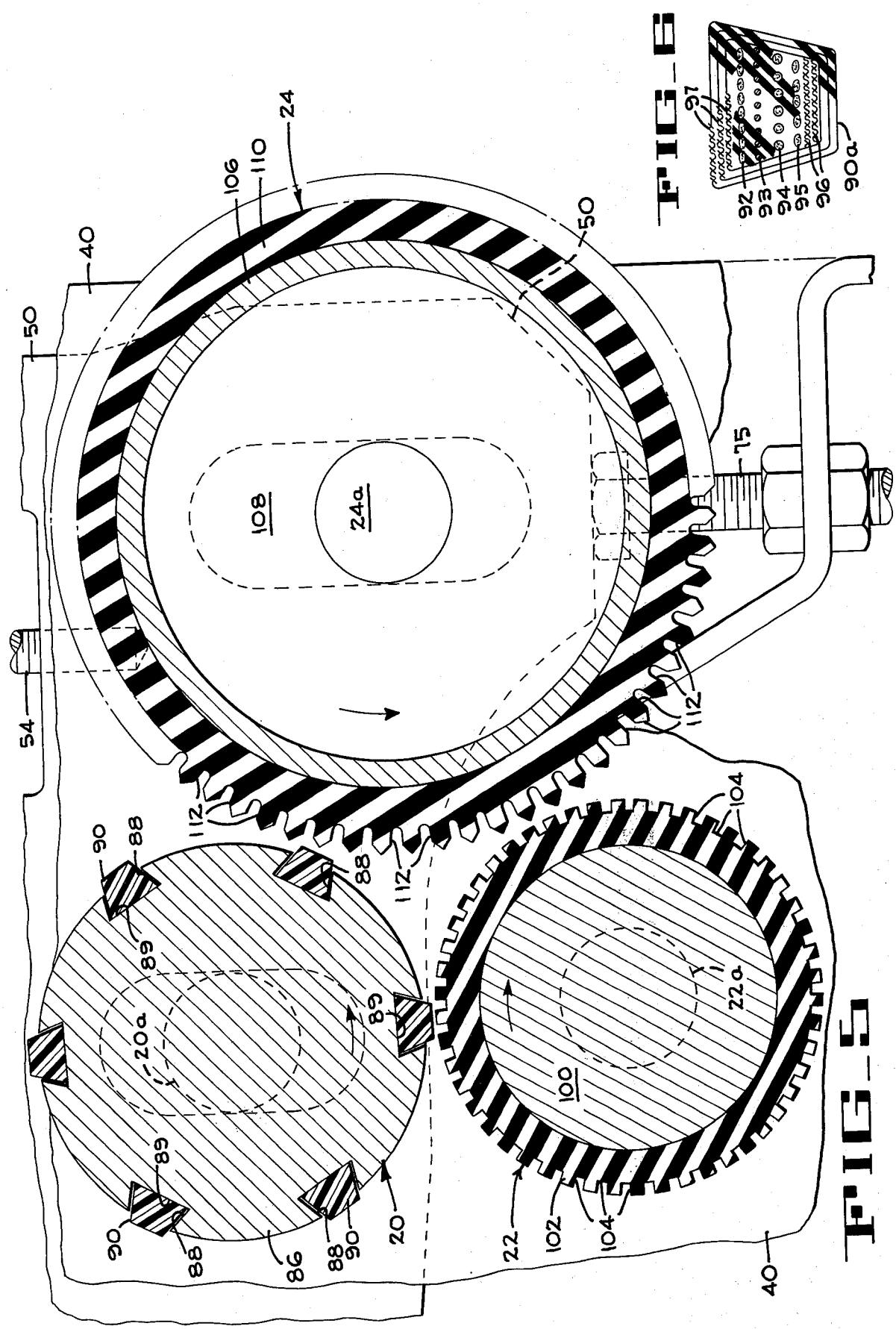

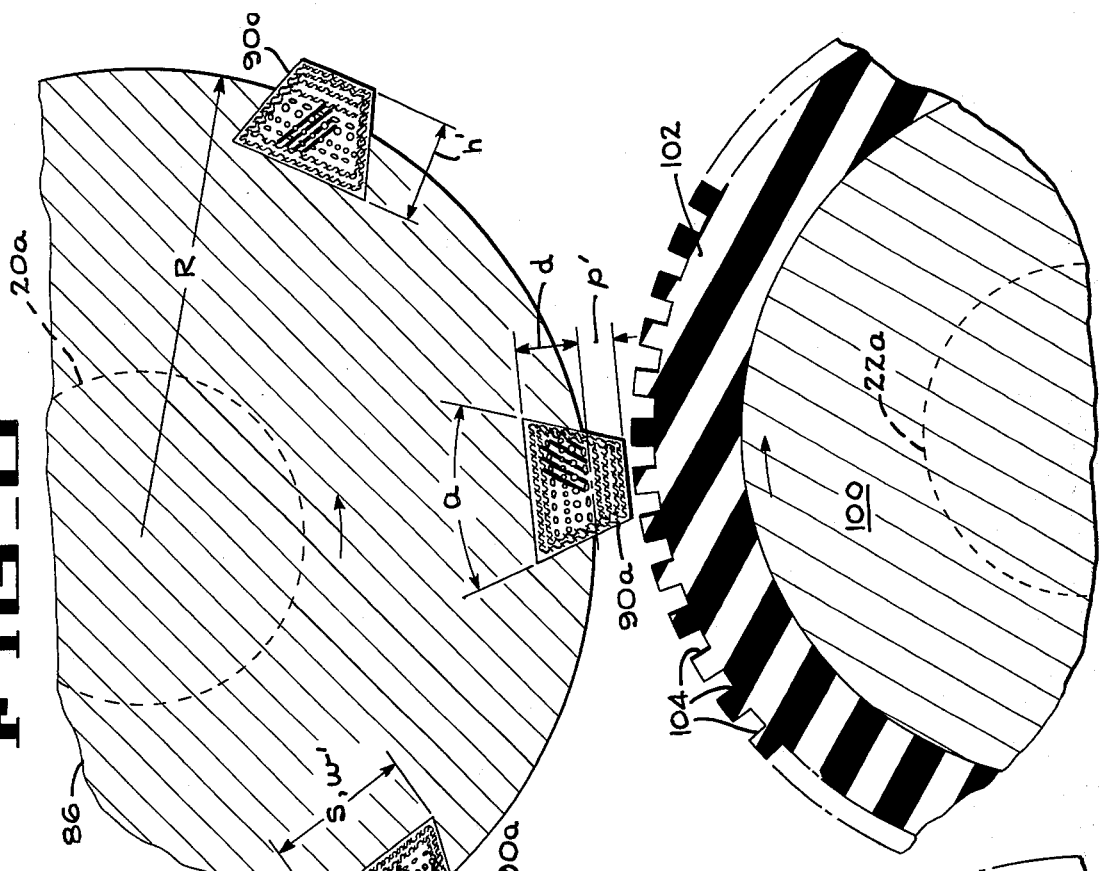
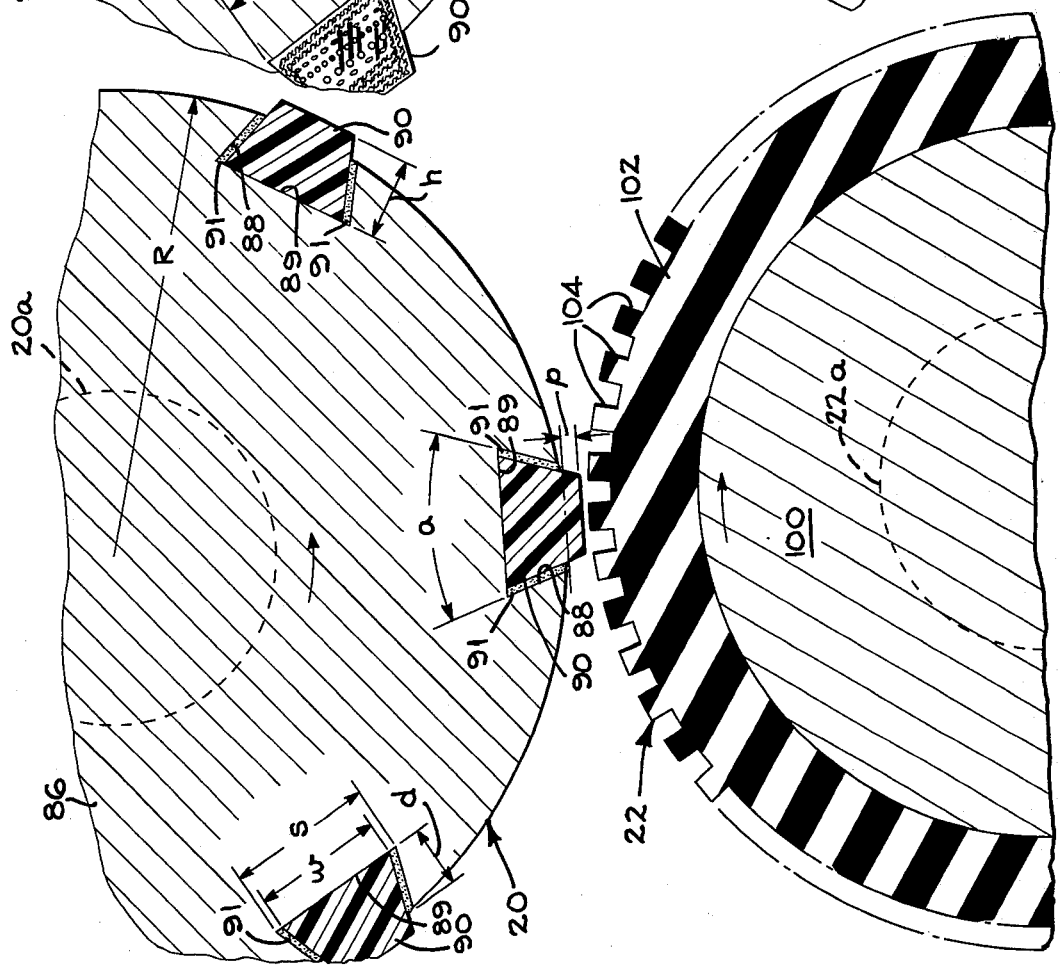

VINE CROP HARVESTER PINCH OFF ROLLER WITH INSERTS

FIELD OF THE INVENTION

This invention relates to vine crop harvesters and more particularly to harvesters designed to pick up cucumber vines and attached crops in the field and pinch the cucumbers off the vines as the vines are being pulled through a pair of pinch-off or snapping rolls.

DESCRIPTION OF PRIOR ART

A cucumber harvester having cooperating pinch-off or snapping rolls and a vine pull augmenting roll of a type to which the present invention relates is shown in the U.S. Pat. No. 3,581,747 to Scribner, June 1, 1971. A similar vine crop harvester is shown in the U.S. Pat. Nos. 3,387,611 to Looker, 3,536,140 Looker, Oct. 27, 1970 and 3,387,612 Tillotson June 11, 1968, both assigned to the FMC Corporation. In these devices, as in that of the present invention, the vines are severed and then pulled through snapping rolls and the pickles or cucumbers are left in front of the rolls.

The U.S. Pat. No. 1,723,492, to Ryder Aug. 6, 1929 discloses a string bean harvester wherein the bean pods themselves pass between highly deformable stripping rolls which strip the pods from the vines. In FIG. 10 of this patent grooved stripping rolls are provided with sponge rubber inserts which project a substantial distance from the periphery of the roll and are provided with a protective or wear resistant soft rubber coating. These inserts must be made of soft yieldable sponge rubber to avoid injury to the bean pods as they pass between the rolls. The inserts are of rectangular cross section.

The U.S. Pat. No. 3,668,753 to Hasegawa June 13, 1972, discloses a steel roller for a sanding belt which roller is formed with helical grooves having slightly dove tailed recesses into which are fitted pressure elements formed of wear resistant rubber. The drawings of this patent show the roller pressure elements projecting about half way out of the groove in the roller but the patent mentions that the groove have a depth of at least half but less than the full height of the pressure elements, without mentioning any precise and preferred degree of projection of the elements.

The patent to Thiel et al. U.S. Pat. No. 3,060,545, Oct. 30, 1962, is directed to a web spreading device wherein round section rubber lacing extends around circular section grooves in a drum and the lacing is stretched back and forth in the grooves by a wobbler to flatten out webs such as paper or the like.

SUMMARY OF THE INVENTION

The present invention will be described as employed in a cucumber (pickle) harvester such as those of the aforesaid FMC Corporation patents and as now manufactured by the FMC Corporation, assignee of the invention. The present practice in the mechanical field harvesting of cucumbers is once-over harvesting wherein the green vines are severed and delivered by a feed conveyor to snapping rolls. These rolls both pinch off the cucumbers on the vines and grip and pull on the vines, thereby discarding the vines, whereas the cucumbers, which do not pass through the rolls are collected separately. In some of these machines, the snapping rolls are backed up by a vine pull roll. The economics of this crop are such that the small or partially developed cucumbers have the highest market value because these are the basis for the pickle industry. Experience with harvesting machines of this type has shown the small cucumbers, often referred to as pickles, are tenaciously connected to the vines. Since the cucumbers and pickles do not pass through the snapping rolls of these machines, the rolls must pull on the vines with enough force to pull the vines free from the cucumbers, which are held back or restrained at the nip of the snapping rolls. In order to render the snapping rolls more aggressive, it has been proposed to cover one or both of the snapping rolls with the ribbed or corrugated rubber covering. It has also been proposed to augment the pull of the snapping rolls on the vines by means of a third roll, referred to as a pull roll, which cooperates with one of the snapping rolls (usually the lower roll) and produces an additional pull or tension on the vines after they have passed through the snapping rolls, thereby assisting in pulling the vines clear of the crop. In some cases it has been found that even these expedients, adopted to increase the pull, may leave something to be desired, and the present invention is directed to further increasing the aggressiveness of the snapping rolls.

It is known that attempts were made to increase the aggressiveness of one or both of the pinch rollers by coating the rubber covering of a roll with a rubber-like compound containing an abrasive but this expedient was unsatisfactory in that the effective field operational time of the improved roll was short.

Applicants' assignee, in an effort to increase the aggressiveness of the snapping rolls machined slots in one of the steel snapping rolls and inserted removable insert steel wedges, but it was found that even though the wedge inserts were made of steel they wore down rapidly in the field so that the effectiveness of the roll was not maintained. It is to be noted that in normal and muddy field operations, dirt is inevitably conveyed to the rolls, passes between them and hence abrades the inserts in the rolls.

In a further effort to increase the aggressiveness of one of the snapping rolls while providing long life, it was decided to experiment with inserts of trapezoidal shape cut from lengths of standard A-size rubber V-belts. These belts had an all rubber core of carbon black reinforced rubber and an outer canvass wrapping, the parts all being vulcanized together. The performance of these inserts, although they are inexpensive and readily replaceable, was not acceptable. The rubber core of the belts deteriorated or crumbled and due to the abrasive conditions in the field, the fabric cover would wear off thereby exposing the deteriorated inner all rubber core, which promptly wore down to the surface of the steel roll.

It was then decided to experiment with an insert which was substantially homogeneously wear resistant, as compared to the aforesaid standard V-belt having a wear resistant wrapping and a rubber core.

Inserts were cut from a length of V-belt material formed of extruded ureathane elastomeric material. This material, being formed by extrusion, is homogenously wear resistant and has a shape which is geometrically maintained during commercial production so that it will consistently fit the undercut grooves in the steel snapping roll. Tests showed that the ureathane inserts have longer life than the aforesaid standard rubber core V-belt type inserts and although the surface of he extruded material appears glazed or glossy when received in its extruded form, the glazed appearance of the surface quickly disappears in field operation and the aggressiveness of a roll provided with such inserts is substantially increased. The urethane material has a surprisingly high coefficient of friction in actual operation.

Another experiment was conducted with what is known as spliceable V-belting material which has the external appearance of a standard A-size V-belt, but which has a number of layers of cords embedded in the rubber core of the belting. These cords eliminated crumbling and degeneration of the rubber core, and this belting was also substantially homogenously wear resistant. It had a longer life in the field than that of the standard, rubber core V-belt material but was not as long lived as the preferred ureathane extruded belting material.

BRIEF DESCRIPTION OF THE DRAWINGS

FIG. 1 is a partial side elevation of a cucumber harvester embodying the present invention with parts broken away.

FIG. 2 is an enlarged side elevation of the harvester showing the drive to the snapping rolls and pull roll.

FIG. 3 is a section taken on 3 — 3 of FIG. 2.

FIG. 4 is a section taken on 4 — 4 of FIG. 2.

FIG. 5 is an enlarged section to the snapping rolls and pull roll showing one embodiment of the present invention.

FIG. 6 is an enlarged section of an insert in a second embodiment of the invention.

FIG. 7 is a still further enlarged section through the snapping roll showing the preferred urethane extrusion embodiment of the invention.

FIG. 8 is a section like FIG. 7 showing the spliceable belting embodiment of the invention.

GENERAL HARVESTER DESCRIPTION

The harvester herein illustrated is of the self propelled type such as that shown in the patent to Scribner U.S. Pat. No. 3,581,747 although it is to be understood that the snapping roll of the present invention can be installed on a cucumber harvester of any general construction, such as one propelled by a farm tractor. Only enough of the harvester will be described to illustrate the relationship of the present invention to the rest of the machine.

In the once over harvesting operation of the present invention, the growing cucumber vines are cut off at the ground and the vines and attached cucumbers are conveyed upwardly by a feed conveyor to a set of snapping rolls. The snapping rolls grip the vines and pull them through wherein the cucumbers are snapped clear of the rolls so that the vines are carried away whereas the cucumbers drop back into a collector conveyor.

Referring to FIG. 1, which principally illustrates that portion of the machine at the snapping rolls, the harvester is illustrated generally at 10 and in this embodiment is of the self-propelled type, having front wheels 12 and driven rear wheels 14. Vines V with attached cucumbers C are severed adjacent the ground level as the machine is propelled along rows of crops. The nature of the severing action is not critical to the present invention and can be performed by sickle bars, V-knives, rotating discs or the like (not shown). The vines V with attached cucumbers C are delivered by the severing devices to a cleated belt feed conveyor 16, the details of which are not critical to the present invention, which elevates and conveys the crop to the nip of a set of snapping rolls 20, 22. In the present invention, the upper snapping roll 20 is provided with inserts. Cooperating with the lower snapping roll is a pull roll 24 which augments the pull on the vines V to assist in snapping the cucumbers free of the vines.

The detached cucumbers C drop onto a laterally running collector conveyor 26 driven by a hydraulic motor 28 which conveyor drops the cucumbers onto an elevator conveyor 30, also driven by a hydraulic motor, not shown. The conveyor 30 delivers the cucumbers C to a cross conveyor 32 driven by a hydraulic motor 33 and the latter drops the harvested cucumbers into a hopper 34. The vines V drop through a chute 35 to the ground.

ROLL MOUNTING AND DRIVE

Referring to FIGS. 2–4, the harvesting rolls are mounted between side plates of the machine, one of which is indicated generally at 40 in these figures. These figures also show the side of the machine at which the drives for the rolls are provided. The upper snapping roll 20 and the pull roll 24 are independently mounted so that they can be lifted from the lower snapping roll 22.

The rolls 22 and 24 are driven by a hydraulic motor 42 (FIG. 3), having a drive shaft 44. The motor housing is secured by bolts 45 to an adjustably mounted plate 46. The plate 46 is adjustably secured to the upper end of a roll lift arm 50 by means of bolts 52 which extend through elongated slots in the plate 46. A jack screw 54 is disposed between the lift arm 50 and the mounting plate 46 for the motor 42, which provides for take-up adjustment of the motor mounting plate 46.

The lift arm 50 is pivoted to the side frame 40 of the apparatus at 53 (FIG. 2) and with the exception of the motor mounting and associated drive connections, a similar lift arm 50 (not shown) is mounted on the opposite side plate assembly of the harvester.

The upper snapping roll 20 and the pull roll 24 are both mounted between the opposed lift arms 50. As seen in FIG. 3, a stub shaft 24a of the pull roll 24 rotates in the arm 50 and is confined by collars 54, 55 secured to the stub shaft. A drive sprocket 56 is keyed to the end of the roll stub shaft. A corresponding stub shaft is provided at the other end of the roll 24, but that shaft does not mount a drive sprocket.

As seen in FIG. 4, the upper snapping roll 20 has its stub shaft 20a rotatably mounted in the lift arm 50 and confined by collars 58, 59. This stub shaft mounts a drive sprocket 60. As in the case of the pull roll 24, no drive sprocket is on the stub shaft (not shown) for the other end of the upper snapping roll 20.

The rolls 20, 24 are driven by a sprocket 62 (FIG. 2) on hydraulic motor shaft 44 and a chain 64 trained around the motor sprocket and the roll sprockets 60, 56 previously described. The two lift arms 50 can be raised to clear obstructions as required. This action is provided by an hydraulic cylinder 66 for each arm which is pivoted to the side frame at 68 and pivoted at 69 to a plate 70 bolted to the lift arm. The piston 72 of each hydraulic cylinder 66 (FIG. 2) can be raised by the application of fluid under pressure to each of the lines 73 connected to the cylinders 66. The lift arms 50 and the rolls mounted thereon are lowered against an adjustable stop 75 (FIG. 2) projecting upwardly from a frame element, which is set to provide a small gap (about 1/32 inch) between the snapping rolls 20, 22, a regulated hydraulic pressure is applied to the upper line 74 for cylinder 66 to provide a cushioned force between the lift arms 50 and their associated stops 75.

The stub shaft 22a of the lower snapping roller 22 is rotatably mounted directly in the side plate 40 (FIG. 4) and its counterpart is similarly mounted in the opposite side plate. As seen in FIGS. 2 and 4, the stub shaft 22a mounts a sprocket 76 which is driven from a hydraulic motor 77 secured to a bracket 78 on the side plate 40 (FIG. 3). The shaft 79 of the motor 77 mounts a sprocket 80 (FIG. 2), which drives the sprocket 76 for the lower snapping roller 22 by means of a chain 82. The directions of rotation are such that adjacent surfaces of the snapping rolls 20, 22 rotate in the same direction for pulling vines through the rolls and the pull roll 24 rotates in the same direction as the adjacent surface of the lower snapping roll 22 for pulling vines between these rolls. The direction of rotation of these rolls is indicated by arrows in various figures.

ROLL DETAILS

Details of preferred roll constructions are shown in FIG. 5. The upper snapping roll 20, which forms the subject matter of the present invention, has a steel body 86 provided with six undercut or dovetail slots having angled sidewalls 88 to receive the inserts 90 of the present invention. The details of the inserts will be discussed presently.

The lower snapping roll 22 has a steel body 100 which is covered by a rubberized cover 102, peripherally grooved at 104 to increase the gripping action of the cover. The cover 102 is preferably made of fabric reinforced rubberized material such as conveyor belting. The pull roll 24 is in the form of a steel cylinder 106 having end plates 108 and covered with a rubberized cover 110 that is serrated at 112 to augment the pull of this roll on the vines which pass down between the pull roll 24 and the lower snapping roll 22.

FIG. 7 illustrates the geometry of the upper snapping roll 20. The body 100 has a radius R of 1.69 inches which means that the diameter of the body is 3.38 inches or about 3⅜ inches. The sidewalls 88 of the undercut grooves in the steel body 86 of the roll have an included angle $a$ of 36° to match the corresponding angle of a conventional V-belt. The base 89 of the undercut grooves has a width $s$ of ½ inch, and the depth $d$ of each groove is from 0.220 inches to 0.230 inches. The width $w$ of the polyurethane insert 90 is about 0.492 inches and the height $h$ of the insert is about 5/16 inches. This means that each insert 90 projects past the periphery of the steel roll body 86 by a distance $p$ of about 0.0825 inches to 0.0925 inches, or roughly, about 3/32 inches.

It can be seen from the above dimensions that as installed, the polyurethane inserts 90 do not completely span the groove sidewalls 88, that is, there is an initial gap or clearance between both sides of the inserts 90 and the undercut side walls 88 of the grooves. This facilitates initial insertion of the inserts in the grooves and experience in the field has shown that the gaps are soon filled with dirt compacted between the insert side walls and the undercut sidewalls 88 of the grooves, as indicated at 91 in FIG. 7. This dirt, which is carried up with the crop during the harvesting operation, tightly wedges the inserts 90 in place and prevents dislodgement or rolling from the position shown in FIG. 7.

In operation, the stop screws 75 (FIG. 2) for the roll supporting arms 50 are set to provide a small clearance of about 1/32 inches between the outer faces of the inserts 90 and the periphery of the lower snapping roller 22. As mentioned, the coefficient of friction of the extruded polyurethane material forming the inserts 90 has been found to be surprisingly high and the projection $p$ of the inserts from the body 86 is large enough to provide an aggressive pulling action on the vines, yet small enough to prevent dislodgement of the inserts. The polyurethane material is firm but flexible and has some resiliency, having a Shore durometer of 85 on scale A. The wear characteristics of the material are good and are taken into consideration in selecting the distance $p$ representing the amount of insert exposed to provide a gripping action. By way of example, the original inserts 90 were cut from lengths of "Eagle Urethane Belting" manufactured by the Eagle Company of Des Planes, Illinois.

As mentioned, dirt 91 soon wedges itself between the inserts 90 and the side walls 88 of the undercut grooves so that the inserts, although easily inserted, remain firmly in place during the harvesting operation.

MODIFIED FORM

FIG. 6 shows an insert 90a which has most of the wear advantages of the polyurethane insert 90 but is of a different construction. The insert 90a is formed from spliceable V-belt belting material manufactured by the Gates Rubber Company of Denver, Colorado. The insert has a special core construction, wherein the entire core can be said to be "substantially filled" with fabric reinforcing material, such as layers of cords 92-95 and two bands of fabric 96 embedded in a rubber core matrix and wrapped in a three ply layer of fabric 97. Of course, these elements are all vulcanized together.

The dimensions of the insert 90a are somewhat greater than those of the extruded polyurethane insert 90 previously described and are illustrated in FIG. 8. The angle $a$ and the dimensions $d$ and $s$ of undercut grooves in the steel hub 86 of the snapping roll 20' are the same as those previously described. In the form of FIG. 8, the insert 90 has a width $w$ of ½ inch and a height $h$ of ⅜ inch. Thus, the projection $p'$ of the insert 90a past the periphery of the steel roll body 86 varies from 0.154 inches to 0.155 inches, or roughly, a little over 3/32 inches. The inserts 90a of FIGS. 6 and 8 also provide a homogenous wear resistant body comparable to the polyurethane inserts 90 previously described. Wear tests were run in the laboratory for 334 hours at 100 RPM on a 1 foot long roll embodying the inserts, which roll rubbed on a spring loaded spring wear plate. These tests, although they did not exactly duplicate field conditions were run to indicate the durability of the inserts. As a result of these tests, it was found that the polyurethane extruded inserts 90 had a wear rate that was about 1/5 that of an insert (not shown) formed of standard, rubber core V-belt material. The composite inserts 90a of FIGS. 6 and 8 had a wear rate of about ⅓ that of the aforesaid standard V-belt material. Both inserts 90 and 90a perform satisfactorily in terms of aggressiveness of the pulling action and remain in their grooves. Also wear between the bevelled sides walls of the inserts and the undercut sidewalls 88 of the grooves in the roll were minimal. However, as mentioned above, the polyurethane material, the dimensions of which do not vary from sample to sample and the wear qualities of which are superior to all samples tested, is the preferred material for the inserts of the present invention.

Although the best mode contemplated for carrying out the present invention has been herein shown and described, it will be apparent that modification and variation may be ma made without departing from what is regarded to be the subject matter of the invention.

What we claim is:

1. In a harvester for vine crops such as cucumbers, said harvester having a mobile frame, conveyor means for picking up a mass of vines and attached crop and delivering the mass to the nip of a pair of elongated contra-rotating cylindrical snapping rolls for pinching the crop off the vines as the vines are pulled through the rollers; the improvement wherein one of said snapping rolls is formed with a plurality of axially extending, undercut grooves, the contours of which lie in an isoscles trapezoid, and elongated axially extending, vine pull augmenting, trapezoidal section insert strips complementary to and mounted in said grooves, said strips each comprising a body of elastomeric, homogenously wear resistant material, said grooves and inserts having relative radial dimensions such that said inserts project past the periphery of said one snapping roller by a distance of about 3/32 inches.

2. The harvester roll of claim 1, wherein said inserts are about ½ inch wide at their base and about 5/16 inch thick.

3. The harvester roll of claim 1, wherein said inserts are formed of an extruded, flexible elastomeric urethane material.

4. The harvester roll of claim 3, wherein said inserts have a Shore durometer of about 85 on scale A.

5. The harvester roll of claim 3, wherein the other of said snapping rolls is a steel roll having a cover of rubberlike material.

6. The harvester roll of claim 1, wherein said inserts are formed of vulcanized V-belt material having a rubber core that is substantially filled with layers of reinforcing material.

* * * * *

UNITED STATES PATENT OFFICE
CERTIFICATE OF CORRECTION

PATENT NO. : 3,916,913
DATED : NOVEMBER 4, 1975.
INVENTOR(S) : OLIN L. LOOKER ET AL

It is certified that error appears in the above-identified patent and that said Letters Patent are hereby corrected as shown below:

Column 6, line 45: change "w" to --w'--;

line 46: change "h" to --h'--.

On the first page under "Assignee:" change "Corporated" to --Corporation--.

Signed and Sealed this sixth Day of April 1976

[SEAL]

Attest:

RUTH C. MASON
*Attesting Officer*

C. MARSHALL DANN
*Commissioner of Patents and Trademarks*